US011252035B2

(12) United States Patent
Wang et al.

(10) Patent No.: US 11,252,035 B2
(45) Date of Patent: Feb. 15, 2022

(54) DATA CONFIGURATION METHOD AND APPARATUS

(71) Applicant: Huawei Technologies Co., Ltd., Shenzhen (CN)

(72) Inventors: Chunyan Wang, Nanjing (CN); Muhang Tang, Nanjing (CN); Jie Liu, Nanjing (CN); Jianhao Yu, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/084,240

(22) Filed: Oct. 29, 2020

(65) Prior Publication Data

US 2021/0051068 A1 Feb. 18, 2021

Related U.S. Application Data

(63) Continuation of application No. PCT/CN2019/092123, filed on Jun. 20, 2019.

(30) Foreign Application Priority Data

Sep. 30, 2018 (CN) .......................... 201811161517.3

(51) Int. Cl.
*H04L 12/24* (2006.01)
(52) U.S. Cl.
CPC ...... *H04L 41/0883* (2013.01); *H04L 41/0803* (2013.01); *H04L 41/0853* (2013.01); *H04L 41/0893* (2013.01)

(58) Field of Classification Search
CPC ............. H04L 41/0883; H04L 41/0803; H04L 41/0853; H04L 41/0893
See application file for complete search history.

(56) References Cited

U.S. PATENT DOCUMENTS

| | | | |
|---|---|---|---|
| 2012/0110028 A1* | 5/2012 | Athreya | G06F 16/214 707/803 |
| 2015/0334467 A1 | 11/2015 | Chapman | |
| 2016/0294611 A1* | 10/2016 | Khambatkone | H04L 41/0803 |
| 2017/0078158 A1* | 3/2017 | Dec | G06F 11/30 |
| 2017/0111225 A1* | 4/2017 | Sawal | G06Q 10/101 |
| 2017/0187577 A1* | 6/2017 | Nevrekar | H04L 41/0226 |
| 2019/0132213 A1* | 5/2019 | Na | H04L 41/0226 |
| 2020/0106658 A1* | 4/2020 | A | G06F 16/2448 |

FOREIGN PATENT DOCUMENTS

| | | | | |
|---|---|---|---|---|
| CN | 102447585 A | * | 5/2012 | |
| CN | 103281197 A | | 9/2013 | |
| CN | 106301956 A | | 1/2017 | |
| CN | 106559251 A | | 4/2017 | |
| CN | 108055143 A | | 5/2018 | |
| WO | WO-2017054531 A | * | 4/2017 | ............. H04L 29/06 |
| WO | 2017201315 A1 | | 11/2017 | |

* cited by examiner

*Primary Examiner* — Christopher B Robinson
(74) *Attorney, Agent, or Firm* — Conley Rose, P.C.

(57) ABSTRACT

A data configuration method includes receiving a control packet sent by a control device, where the control packet is generated by the control device based on a yet another next generation (YANG) model and includes a configuration fragment, parsing the control packet to obtain the configuration fragment, and parsing the configuration fragment based on the general module to obtain a configuration command line, and executing the configuration command line.

20 Claims, 5 Drawing Sheets

DATA CONFIGURATION METHOD AND APPARATUS

CROSS-REFERENCE TO RELATED APPLICATIONS

This application is a continuation of International Patent Application No. PCT/CN2019/092123 filed on Jun. 20, 2019, which claims priority to Chinese Patent Application No. 201811161517.3 filed on Sep. 30, 2018, both of which are hereby incorporated by reference in their entireties.

TECHNICAL FIELD

This application relates to the field of remote configuration technologies, and in particular, to a data configuration method and apparatus.

BACKGROUND

A communications network is usually configured using a network configuration protocol (NETCONF). However, as a network scale constantly increases, requirements of network configuration management automation and intelligence become more urgent. Therefore, a new data modeling language, namely, a yet another next generation (YANG) model, used for the NETCONF is generated.

The YANG model may model configuration and status data of a NETCONF-based operation. A control device may send configuration data to a network device based on a pre-established YANG model, and the network device may obtain the configuration data through parsing based on the YANG model. In addition, because a module of a service in the YANG model is determined based on a configuration command line of the service, different services correspond to different modules. When the configuration command line of the service changes, both the control device and the network device need to update the YANG model. Consequently, there is a problem of complex network configuration and maintenance caused by a service change during YANG model-based network configuration.

SUMMARY

This application provides a data configuration method and apparatus, to resolve a problem that network configuration and maintenance are complex due to a service change.

According to a first aspect, a data configuration method is provided and includes receiving a control packet sent by a control device, where the control packet is generated by the control device based on a YANG model, and the control packet includes a configuration fragment, parsing the control packet to obtain the configuration fragment, where the configuration fragment meets a definition of a general module in the YANG model, and parsing the configuration fragment based on the general module to obtain a plurality of configuration command lines, and executing the plurality of configuration command lines.

In the foregoing solution, a network device parses the control packet based on the YANG model to obtain the configuration fragment, where the control packet includes the configuration fragment, and the configuration fragment meets the definition of the general module in the YANG model, and parses the configuration fragment to obtain the plurality of configuration command lines, and executes the plurality of configuration command lines. Therefore, for configuration command lines of different services, the network device can obtain corresponding configuration fragments based on the general module. In other words, only one general module can be maintained for all services, and when a configuration command line of a service changes, the YANG model does not need to be updated (specifically, the general module does not need to be updated). In this way, network configuration and maintenance of the YANG model are simplified, and an existing problem that network configuration and maintenance of the YANG model are complex due to a change of a service is resolved.

With reference to the first aspect, in a first possible implementation of the first aspect, the general module includes a plurality of nodes, the plurality of nodes correspond to the plurality of configuration command lines, a hierarchical relationship between the plurality of nodes reflects an execution sequence of the plurality of configuration command lines, and a node value of each of the plurality of nodes represents one configuration command line.

In the foregoing solution, the hierarchical relationship between the plurality of nodes reflects the execution sequence of the plurality of configuration command lines, and a node value of each of the plurality of nodes represents one configuration command line such that the network device can execute the configuration command lines based on the hierarchical relationship between the nodes in the general module, thereby avoiding a problem that configuration cannot take effect because the execution sequence of the configuration command lines is incorrect.

With reference to the first possible implementation of the first aspect, in a second possible implementation of the first aspect, a node name of each of the plurality of nodes represents a level of the node.

With reference to the first aspect or the first or the second possible implementation of the first aspect, in a third possible implementation of the first aspect, the general module is independent of a service, and the plurality of configuration command lines belong to a plurality of services.

In the foregoing solution, the plurality of configuration command lines belong to the plurality of services such that the plurality of configuration command lines belonging to the plurality of services can be carried in one control packet, thereby improving configuration flexibility.

According to a second aspect, a data configuration method is provided and includes generating a control packet based on a YANG model and a plurality of configuration command lines, where the control packet includes a configuration fragment, and the configuration fragment meets a definition of a general module in the YANG model, and sending the control packet to a network device.

In the foregoing solution, a control device generates the control packet based on the YANG model and the plurality of configuration command lines, where the control packet includes the configuration fragment, and the configuration fragment meets the definition of the general module in the YANG model, and the control device sends the control packet to the network device. Therefore, for configuration command lines of different services, the control device can obtain corresponding configuration fragments based on the general module. In other words, only one general module can be maintained for all services, and when a configuration command line of a service changes, the YANG model does not need to be updated (specifically, the general module does not need to be updated). In this way, network configuration and maintenance of the YANG model are simplified, and an existing problem that network configuration and maintenance of the YANG model are complex due to a change of a service is resolved.

With reference to the second aspect, in a first possible implementation of the second aspect, the general module includes a plurality of nodes, the plurality of nodes correspond to the plurality of configuration command lines, a hierarchical relationship between the plurality of nodes reflects an execution sequence of the plurality of configuration command lines, and a node value of each of the plurality of nodes represents one configuration command line.

In the foregoing solution, the hierarchical relationship between the plurality of nodes reflects the execution sequence of the plurality of configuration command lines, and a node value of each of the plurality of nodes represents one configuration command line such that the network device can execute the configuration command lines based on the hierarchical relationship between the nodes in the general module, thereby avoiding a problem that configuration cannot take effect because the execution sequence of the configuration command lines is incorrect.

With reference to the first possible implementation of the second aspect, in a second possible implementation of the second aspect, a node name of each of the plurality of nodes represents a level of the node.

With reference to the second aspect or the first or the second possible implementation of the second aspect, in a third possible implementation of the second aspect, the general module is independent of a service, and the plurality of configuration command lines belong to a plurality of services.

In the foregoing solution, the plurality of configuration command lines belong to the plurality of services such that the plurality of configuration command lines belonging to the plurality of services can be carried in one control packet, thereby improving configuration flexibility.

According to a third aspect, a data configuration apparatus is provided and includes a receiving module configured to receive a control packet sent by a control device, where the control packet is generated by the control device based on a YANG model, and the control packet includes a configuration fragment, and a processing module configured to parse the control packet to obtain the configuration fragment, where the configuration fragment meets a definition of a general module in the YANG model, where the processing module is further configured to parse the configuration fragment based on the general module to obtain a plurality of configuration command lines, and execute the plurality of configuration command lines.

With reference to the third aspect, in a first possible implementation of the third aspect, the general module includes a plurality of nodes, the plurality of nodes correspond to the plurality of configuration command lines, a hierarchical relationship between the plurality of nodes reflects an execution sequence of the plurality of configuration command lines, and a node value of each of the plurality of nodes represents one configuration command line.

With reference to the first possible implementation of the third aspect, in a second possible implementation of the third aspect, a node name of each of the plurality of nodes represents a level of the node.

With reference to the third aspect or the first or the second possible implementation of the third aspect, in a third possible implementation of the third aspect, the general module is independent of a service, and the plurality of configuration command lines belong to a plurality of services.

For beneficial effects of the apparatus provided in the third aspect and the possible implementations of the third aspect, refer to the beneficial effects brought by the first aspect and the possible implementations of the first aspect. Details are not described herein again.

According to a fourth aspect, a data configuration apparatus is provided and includes a processing module configured to generate a control packet based on a YANG model and a plurality of configuration command lines, where the control packet includes a configuration fragment, and the configuration fragment meets a definition of a general module in the YANG model, and a sending module configured to send the control packet to a network device.

With reference to the fourth aspect, in a first possible implementation of the fourth aspect, the general module includes a plurality of nodes, the plurality of nodes correspond to the plurality of configuration command lines, a hierarchical relationship between the plurality of nodes reflects an execution sequence of the plurality of configuration command lines, and a node value of each of the plurality of nodes represents one configuration command line.

With reference to the first possible implementation of the fourth aspect, in a second possible implementation of the fourth aspect, a node name of each of the plurality of nodes represents a level of the node.

With reference to the fourth aspect or the first or the second possible implementation of the fourth aspect, in a third possible implementation of the fourth aspect, the general module is independent of a service, and the plurality of configuration command lines belong to a plurality of services.

For beneficial effects of the apparatus provided in the fourth aspect and the possible implementations of the fourth aspect, refer to the beneficial effects brought by the second aspect and the possible implementations of the second aspect. Details are not described herein again.

According to a fifth aspect, a network device is provided and includes a receiver configured to receive a control packet sent by a control device, where the control packet is generated by the control device based on a YANG model, and the control packet includes a configuration fragment, and a processor configured to parse the control packet to obtain the configuration fragment, where the configuration fragment meets a definition of a general module in the YANG model, where the processor is further configured to parse the configuration fragment based on the general module to obtain a plurality of configuration command lines, and execute the plurality of configuration command lines.

With reference to the fifth aspect, in a first possible implementation of the fifth aspect, the general module includes a plurality of nodes, the plurality of nodes correspond to the plurality of configuration command lines, a hierarchical relationship between the plurality of nodes reflects an execution sequence of the plurality of configuration command lines, and a node value of each of the plurality of nodes represents one configuration command line.

With reference to the first possible implementation of the fifth aspect, in a second possible implementation of the fifth aspect, a node name of each of the plurality of nodes represents a level of the node.

With reference to the fifth aspect or the first or the second possible implementation of the fifth aspect, in a third possible implementation of the fifth aspect, the general module is independent of a service, and the plurality of configuration command lines belong to a plurality of services.

For beneficial effects of the network device provided in the fifth aspect and the possible implementations of the fifth aspect, refer to the beneficial effects brought by the first aspect and the possible implementations of the first aspect. Details are not described herein again.

According to a sixth aspect, a control device is provided and includes a processor configured to generate a control packet based on a YANG model and a plurality of configuration command lines, where the control packet includes a configuration fragment, and the configuration fragment meets a definition of a general module in the YANG model, and a transmitter configured to send the control packet to a network device.

With reference to the sixth aspect, in a first possible implementation of the sixth aspect, the general module includes a plurality of nodes, the plurality of nodes correspond to the plurality of configuration command lines, a hierarchical relationship between the plurality of nodes reflects an execution sequence of the plurality of configuration command lines, and a node value of each of the plurality of nodes represents one configuration command line.

With reference to the first possible implementation of the sixth aspect, in a second possible implementation of the sixth aspect, a node name of each of the plurality of nodes represents a level of the node.

With reference to the sixth aspect or the first or the second possible implementation of the sixth aspect, in a third possible implementation of the sixth aspect, the general module is independent of a service, and the plurality of configuration command lines belong to a plurality of services.

For beneficial effects of the control device provided in the sixth aspect and the possible implementations of the sixth aspect, refer to the beneficial effects brought by the second aspect and the possible implementations of the second aspect. Details are not described herein again.

According to a seventh aspect, a computer readable storage medium is provided. The computer readable storage medium stores a computer program, and when the computer program is executed by a processor, the method according to any one of the first aspect is implemented.

According to an eighth aspect, a computer readable storage medium is provided. The computer readable storage medium stores a computer program, and when the computer program is executed by a processor, the method according to any one of the second aspect is implemented.

According to a ninth aspect, a computer program product is provided. The computer program product includes one or more computer instructions, and when the computer instructions are loaded and executed on a computer, the method according to any one of the first aspect is performed.

According to a tenth aspect, a computer program product is provided. The computer program product includes one or more computer instructions, and when the computer instructions are loaded and executed on a computer, the method according to any one of the second aspect is performed.

DESCRIPTION OF EMBODIMENTS

Figure 1:
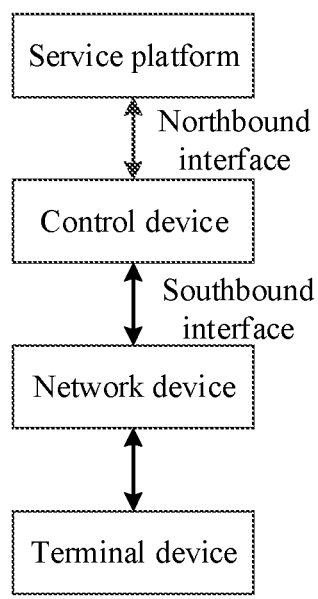
FIG. 1 is a schematic diagram of an application scenario according to an embodiment of this application.

FIG. 1 is a schematic diagram of an application scenario according to an embodiment of this application. As shown in FIG. 1, the application scenario may include a control device and a network device. The control device may send a control packet to the network device using a YANG model.

The YANG model is a data modeling language used to model configuration data and status data of a NETCONF-based operation. A standard developed by the Internet Engineering Task Force (IETF) describes syntax and semantics of the YANG model, how a data model defined in the YANG model is expressed in an Extensible Markup Language (XML), and how a NETCONF operates the data.

Figure 2:
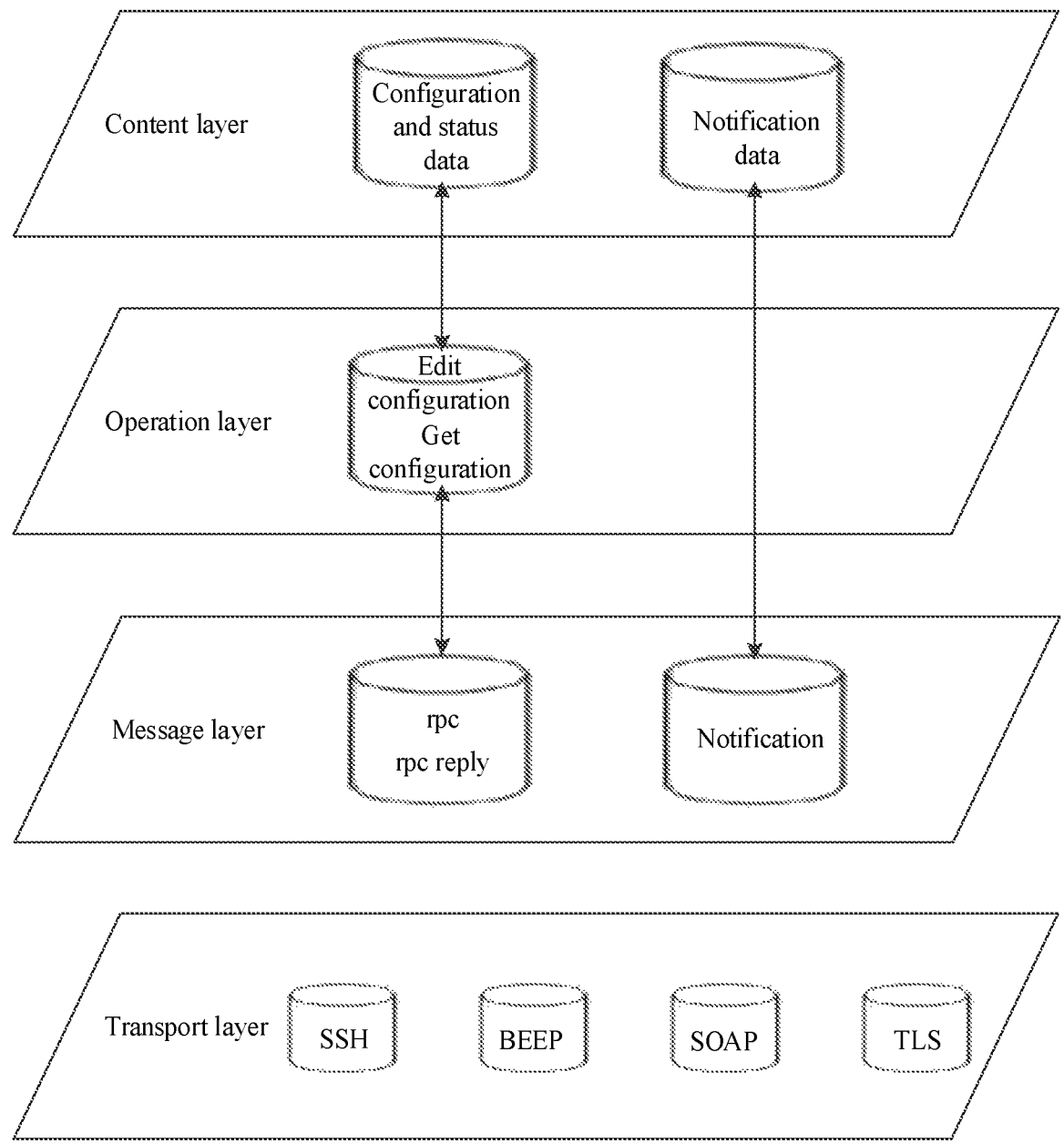
FIG. 2 is a schematic diagram of a NETCONF.

As shown in FIG. 2, the NETCONF includes a transport layer, a message layer, an operation layer, and a content layer. The content layer includes configuration data (Config Data), status data, and notification data. The configuration data and the status data at the content layer may be operations of editing configuration (edit-config), getting configuration (get-config), and the like at the operation layer, and may be a remote procedure call (RPC) message and an RPC reply (rpc-reply) message at the message layer. The notification data at the content layer may be a notification message at the message layer. The transport layer may implement secure transmission based on a secure shell (SSH), a blocks extensible exchange protocol (BEEP), a simple object access protocol (SOAP), and a Transport Layer Security (TLS) protocol.

The YANG model is mainly used to model the operation layer and the content layer in the NETCONF. The YANG model may model the configuration data and the status data at the content layer and the corresponding operations at the operation layer in the NETCONF.

In this embodiment of the present disclosure, that the YANG model models the configuration data may include the following. For a configuration command line that needs to be sent to the network device, the control device generates, based on a definition of a general module in the YANG model, a control packet including a configuration fragment. Specifically, the configuration fragment may be first obtained based on the general module in the YANG and the configuration command line, the configuration fragment is converted into an XML file in a corresponding format, and then final NETCONF message encapsulation is performed on the XML file to obtain the control packet.

As shown in FIG. 1, the application scenario in this embodiment of this application may further include a service platform. The service platform is connected to the control device, and the service platform may send an instruction to the control device such that the control device generates the control packet based on the YANG model, and sends the control packet to the network device.

As shown in FIG. 1, the application scenario in this embodiment of this application may further include a terminal device. The terminal device is connected to the network device, and the terminal device may access a network using the network device.

The service platform may include, for example, a user management system, a log management system, an advertisement platform, a big data analytics platform, and a network management system.

The control device may be a controller, for example, a software-defined networking (SDN) controller.

The network device may be specifically a router, a switch, a firewall, or the like.

The terminal device may also be referred to as user equipment, and may include but is not limited to customer-premises equipment (CPE), a smartphone (for example, an ANDROID mobile phone or an IOS mobile phone), a multimedia device, a streaming device, a personal computer, a tablet computer, a palmtop computer, a mobile Internet device (MID), a wearable intelligent device, or the like.

An interface of the control device between the control device and the network device may be denoted as a southbound interface, and an interface of the control device between the control device and the service platform may be denoted as a northbound interface.

A module of any service in the YANG model is usually determined based on a configuration command line of the service. For example, the service includes an interface type, an access control list (ACL), open shortest path first (OSPF), or the like.

It should be noted that the module in the YANG model may define a hierarchy of nodes and may be used for a NETCONF-based operation. In addition, a module is independent and can be compiled based on a definition of the module and a definition introduced or included elsewhere.

The following describes the embodiments in the technical solutions of the present disclosure in detail with reference to the accompanying drawings. When no conflict occurs, the following embodiments and the features in the embodiments may be mutually combined.

Figure 3:
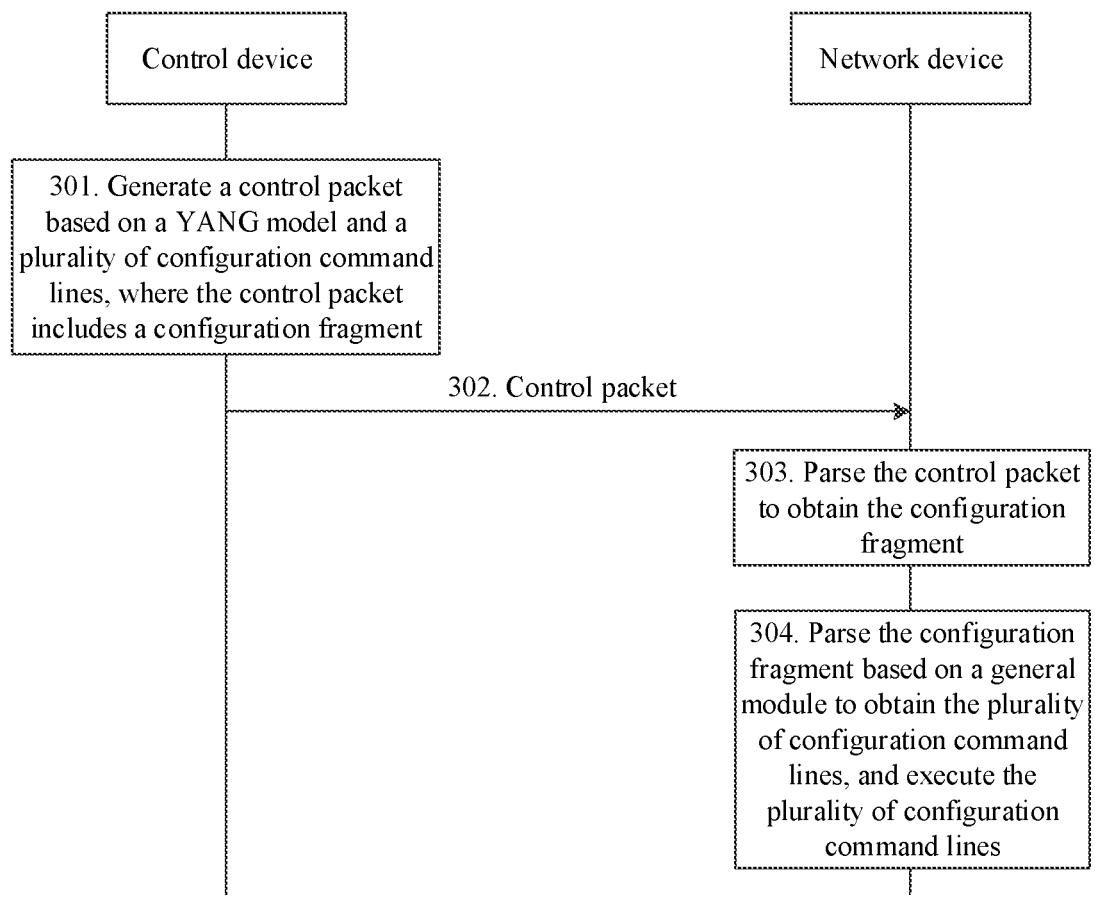
FIG. 3 is a schematic flowchart of a data configuration method according to an embodiment of this application.

FIG. 3 is a schematic flowchart of a data configuration method according to an embodiment of this application. As shown in FIG. 3, the method may include the following steps.

Step 301. A control device generates a control packet based on a YANG model and a plurality of configuration command lines, where the control packet includes a configuration fragment.

Step 302. The control device sends the control packet to a network device.

Step 303. The network device parses the control packet to obtain the configuration fragment.

Step 304. The network device parses the configuration fragment based on the general module to obtain the plurality of configuration command lines, and executes the plurality of configuration command lines.

In step 301, the configuration fragment meets a definition of the general module in the YANG model. In this embodiment of this application, the general module in the YANG model is newly defined, and the general module may be used for configuration of any service. The general module is not determined based on a specific configuration command line of a specific service, but is determined based on a common characteristic of configuration of all services. Herein, the common characteristic of configuration of all services means that configuration of any service is implemented using one or more configuration command lines.

One or more configuration command lines are required for configuration of any service. In this embodiment of this application, based on the general module, a plurality of configuration command lines can be carried in one control packet, to configure one or more services such that configuration efficiency can be increased.

When the control packet includes a plurality of configuration command lines, the plurality of configuration command lines may belong to a same service or different services. It should be noted that in this embodiment of this application, different services are further different types of services, and a same service is specifically a same type of service. For example, an ACL service and an OSPF service are different services (that is, a plurality of services), and an ACL service used to configure a port 1 and an ACL service used to configure a port 2 are a same service (that is, one service). In an existing YANG model, different modules are defined for different services. Therefore, when a control packet is generated based on the existing YANG model, one control packet can include a configuration command line of only one service. Using the general module provided in this embodiment of this application, configuration command lines of a plurality of services can be carried in one control packet, and quantities of configuration command lines of different services may be the same or different. Therefore, in the data configuration method provided in this embodiment of this application, configuration flexibility is greatly improved.

The YANG model modularizes a hierarchy of data into a tree. Each node in the tree has a name (namely, a node name) and a value (namely, a node value), and may also have a sub-node set. In this embodiment of this application, when the general module includes a plurality of nodes, there is a hierarchical relationship between the plurality of nodes. Herein, the hierarchical relationship between the plurality of nodes is a relationship between the plurality of nodes in the tree. Terms such as a parent node and a child node may be used to describe a hierarchical relationship between nodes. For example, assuming that a node 1 may be a parent node of a node 2, and the node 2 may be a parent node of a node 3, the node 1 may be an upper-level node of the node 2, and the node 2 may be an upper-level node of the node 3. In other words, the node 2 may be a lower-level node of the node 1, and the node 3 may be a lower-level node of the node 2.

The general module may include one node, and a node value of the node may represent the plurality of configuration command lines. A location sequence of the plurality of configuration command lines may represent an execution sequence of the plurality of configuration command lines.

Alternatively, the general module may include a plurality of nodes, the plurality of nodes correspond to the plurality of configuration command lines, and a hierarchical relationship between the plurality of nodes may reflect an execution sequence of the plurality of configuration command lines. Further optionally, there may be a one-to-one correspondence or a one-to-many correspondence between the plurality of nodes and the plurality of configuration command lines.

When there may be a one-to-one correspondence between the plurality of nodes and the plurality of configuration command lines, a node value of each of the plurality of nodes may represent one configuration command line. For example, assuming a configuration command line 1 is executed after a configuration command line 2, a node corresponding to the configuration command line 1 may be a parent node of a node corresponding to the configuration command line 2. Further, assuming that a configuration command line 3 is also executed after the configuration command line 2, and an execution sequence of the configuration command line 1 and the configuration command line 3 is not limited, the node corresponding to the configuration command line 1 may also be a parent node of a node corresponding to the configuration command line 3.

When there may be a one-to-many correspondence between the plurality of nodes and the plurality of configuration command lines, a node value of each of the plurality of nodes may represent a plurality of configuration command lines, and a location sequence of the plurality of configuration command lines may represent an execution sequence of the configuration command lines.

Further optionally, a node name of each of the plurality of nodes may represent a level of the node.

It is assumed that the general module includes a plurality of nodes, node names of the plurality of nodes are command-name, command-firstview, command-string, command-secondview, and command-thirdview, and a hierarchical relationship between the nodes may be further that the command-name node is a parent node of the command-firstview node, the command-firstview node is a parent node of the command-secondview node, the command-secondview node is a parent node of the command-thirdview node, and the command-string node is a child node of the command-firstview node, the command-secondview node, and the command-thirdview node. The general module is defined based on the YANG model. Refer to the following example module: huawei-general (which may mean defining a module named huawei-general) augment/huawei-general: command-lists/command-list/command-name:

rw command-name string (which may mean defining a command-name node at a lower level of a command-list node at a lower level of a command-lists node of huawei-general, where a node value of the command-name node is readable and writable, and a type of the node value is a string type)

augment/huawei-general: command-lists/command-list/command-name/command-firstview:

rw command-firstview string (which may mean defining a command-firstview node at a lower level of the command-name node, where a node value of the command-firstview node is readable and writable, and a type of the node value is a string type)

augment/huawei-general: command-lists/command-list/command-name/command-firstview/command-string:

rw command-string string (which may mean defining a command-string node at a lower level of the command-firstview node, where a node value of the command-string node is readable and writable, and a type of the node value is a string type)

augment/huawei-general: command-lists/command-list/command-name/command-firstview/command-secondview:

rw command-secondview string (which may mean defining a command-secondview node at a lower level of the command-firstview node, where a node value of the command-secondview node is readable and writable, and a type of the node value is a string type)

augment/huawei-general: command-lists/command-list/command-name/command-firstview/command-secondview/command-string:

rw command-string string (which may mean defining a command-string node at a lower level of the command-secondview node, where a node value of the command-string node is readable and writable, and a type of the node value is a string type)

augment/huawei-general: command-lists/command-list/command-name/command-firstview/command-secondview/command-thirdview:

rw command-thirdview string (which may mean defining a command-thirdview node at a lower level of the command-secondview node, where a node value of the command-thirdview node is readable and writable, and a type of the node value is a string type)

augment/huawei-general: command-lists/command-list/command-name/command-firstview/command-secondview/command-thirdview/command-string:

rw command-string string (which may mean defining a command-string node at a lower level of the command-thirdview node, where a node value of the command-string node is readable and writable, and a type of the node value is a string type).

In the foregoing definitions, both the command-lists node and the command-list node are container nodes defined in a standard YANG model, and "module" and "augment" are also terms defined in the standard YANG model. For details, refer to a YANG model defined by the IETF. huawei-general indicates the general module defined in this embodiment of the present disclosure. In other words, the general module defined according to the technical solutions of the present disclosure is newly added in the YANG model, and is represented by "huawei-general" in an XML. Subsequently, after receiving an XML including a first configuration fragment, the network device also parses the XML based on the general module defined in this embodiment of the present disclosure.

For example, it is assumed that the control device needs to send the following three configuration command lines to the network device acl number 3385 (which may be used to create an ACL numbered 3385) rule 9 permit icmp source 1.13.55.0.0.0.0.255 destination 2.23.94.0.0.0.0.255 (which may be used to configure, for the ACL numbered 3385, a rule 9 for permitting a packet of an Internet control message protocol (internet control message protocol, ICMP) type with a source address 1.13.55.0.0.0.0.25 and a destination address 2.23.94.0.0.0.0.255 to pass), rule 10 permit ip source 1.13.9.0.0.0.0.255 destination 2.23.30.0.0.0.0.255 (which may be used to configure, for the ACL numbered 3385, a rule 10 for permitting a packet of an Internet Protocol (IP) type with a source address 1.13.9.0.0.0.0.255 and a destination address 2.23.30.0.0.0.0.255 to pass).

In this case, based on the foregoing example general module, an obtained configuration fragment (which may be denoted as the first configuration fragment below) is expressed in the XML, and may be shown as follows

```
<command-lists xmlns="urn:ietf:params:xml:ns:yang:huawei-general">
    <command-list xc:operation="replace">
        <command-name>x</command-name>
            <command-firstview>acl number 3385</command-firstview>
                <command-string>rule 9 permit icmp source 1.13.55.0
```

```
0.0.0.255 destination 2.23.94.0 0.0.0.255</command-string>
                    <command-string>rule 10 permit ip source 1.13.9.0
0.0.0.255 destination 2.23.30.0 0.0.0.255</command-string>
            </command-list>
        </command-lists>.
```

Where x is a node value of a command-name node, acl number 3385 is a node value of a command-firstview node, rule 9 permit icmp source 1.13.55.0.0.0.0.255 destination 2.23.94.0.0.0.0.255 is a node value of a command-string node at a lower level of the command-firstview node, and rule 10 permit ip source 1.13.9.0.0.0.0.255 destination 2.23.30.0.0.0.0.255 is a node value of the command-string node at the lower level of the command-firstview node. xmlns="urn:ietf:params:xml:ns:yang:huawei-general" is an XML namespace, and replace is an operation type. It can be learned that one node in the general module provided in this embodiment of this application may correspond to one configuration command line.

In comparison, if configuration is performed based on the foregoing three configuration command lines of the ACL service using the existing YANG model, a service model of the ACL service is further defined as follows module: huawei-acl (which means defining a module named huawei-acl for the ACL service)
    augment/ietf-acl:access-lists/access-list/access-control-list-name:
        rw access-control-list-name uint32 (which may mean defining an access-control-list-name node at a lower level of an access-list node at a lower level of an access-lists node of huawei-acl, where a node value of the access-control-list-name node is readable and writable, and a type of the node value is 32-bit unsigned integer type)
    augment/ietf-acl:    access-lists/access-list/access-list-entries/access-list-entry/rule-name:
        rw rule-name uint32 (which may mean defining a rule-name node at a lower level of the access-list-entry node, where a node value of the rule-name node is readable and writable, and a type of the node value is a 32-bit unsigned integer type) augment/ietf-acl:access-lists/access-list/access-list-entries/access-list-entry/actions:
        rw actions boolean (which may mean an actions node in the access-list-entry node, where a node value of the actions node is readable and writable, and a type of the node value is a Boolean type)
    augment/ietf-acl:access-lists/access-list/access-list-entries/access-list-entry/matches:
        rw protocol uint32
        rw destination-ipv4-network string
        source-ipv4-network string (which may mean a protocol node, a destination-ipv4-network node, and a source-ipv4-network node at a lower level of a matches node at a lower level of the access-list-entry node, where node values of the protocol node, the destination-ipv4-network node, and the source-ipv4-network node are readable and writable, a type of the node value of the protocol node is a 32-bit unsigned integer type, and types of the node value of the destination-ipv4-network node and the source-ipv4-network node are a string type).

All of the access-lists node, the access-list node, and the matches node are container nodes. huawei-acl indicates a module that is of the ACL service and that is defined using the existing YANG model, and ietf-acl indicates a defined node name and is referenced in huawei-acl.

Then, based on the foregoing model definition of the ACL service, a configuration fragment (which may be denoted as a second configuration fragment below) corresponding to the foregoing three configuration command lines is expressed in an XML, and may be shown as follows

```
<access-lists xmlns="urn:ietf:params:xml:ns:yang:ietf-acl">
    <access-list xc:operation="replace">
        <access-control-list-name>3385</access-control-list-name>
        <access-list-entries>
            <access-list-entry>
                <rule-name>9</rule-name>
                <actions>
                    <permit/>
                </actions>
                <matches>
                    <protocol>1</protocol>
                    <destination-ipv4-network>2.23.94.52/24</destination-ipv4-network>
                    <source-ipv4-network>1.13.55.16/24</source-ipv4-network>
                </matches>
            </access-list-entry>
            <access-list-entry>
                <rule-name>10</rule-name>
                <actions>
                    <permit/>
                </actions>
                <matches>
                    <protocol>0</protocol>
                    <destination-ipv4-network>2.23.30.52/24</destination-ipv4-network>
                    <source-ipv4-network>1.13.9.16/24</source-ipv4-network>
                </matches>
```

```
        </access-list-entry>
      </access-list-entries>
    </access-list>
</access-lists>.
```

Where 3385 is a node value of an access-control-list-name node, and corresponds to the configuration command line acl number 3385, 9 is a node value of a rule-name node, and corresponds to rule 9 in the configuration command line, 1 is a node value of a protocol node, and corresponds to icmp in the configuration command line, permit is a node value of an actions node, and corresponds to permit in the configuration command line, 2.23.94.52/24 is a node value of a destination-ipv4-network node, and corresponds to 2.23.94.52/24 in the configuration command line, and 1.13.55.16/24 is a node value of source-ipv4-network, and corresponds to 1.13.55.16/24 in the configuration command line. 10 is a node value of the rule-name node, and corresponds to rule 10 in the configuration command line, 0 is a node value of the protocol node, and corresponds to IP in the configuration command line, permit is a node value of the actions node, and corresponds to permit in the configuration command line, 2.23.30.52/24 is a node value of the destination-ipv4-network node, and corresponds to 2.23.30.52/24 in the configuration command line, and 1.13.9.16/24 is a node value of source-ipv4-network, and corresponds to 1.13.9.16/24 in the configuration command line. xmlns="urn:ietf:params:xml:ns:yang:ietf-acl" is an XML, namespace, and replace is an operation type. It can be learned that one node in the module of the ACL service in the existing YANG model corresponds to a part of one configuration command line instead of one configuration command line.

It can be learned that, for a same configuration command line, a configuration fragment that meets the definition of the general module provided in this embodiment of this application greatly reduces a data amount of the configuration fragment and is more intuitive and clearer compared with a configuration fragment that meets the definition of the module of the ACL service in the existing YANG model.

For another example, it is assumed that the control device needs to send the following configuration command lines to the network device interface GigabitEthernet0/0/0 (which may be used to enter a gigabit Ethernet (GE) interface 0/0/0)

ip address 192.167.2.1 255.255.0.0 (which may be used to configure an IP address of the GE interface 0/0/0 as 192.167.2.1 and a subnet mask as 255.255.0.0)

acl number 3385 rule 9 permit icmp source 1.13.55.0.0.0.0.255 destination 2.23.94.0.0.0.0.255 rule 10 permit ip source 1.13.9.0.0.0.0.255 destination 2.23.30.0.0.0.0.255 ospf 1 (which may be used to create and run an OSPF process 1)

area 0.0.0.0 (which may be used to create an OSPF area of the OSPF process 1 and enter an OSPF area view)

network 10.1.1.0 0.0.0.255 network 10.1.2.0 0.0.0.255 network 10.1.3.0 0.0.0.255 (which may be used to specify that a primary IP address of an interface running an OSPF protocol falls within a network segment 10.1.1.0 to 10.1.3.0).

Where interface, acl, and ospf are three different services. Based on the general module defined in the present disclosure, interface GigabitEthernet0/0/0, acl number 3385, and ospf 1 may be node values of command-firstview nodes. ip address 192.167.2.1 255.255.0.0 may be a node value of a command-string node at a lower level of a command-firstview node whose node value is interface GigabitEthernet0/0/0. rule 9 permit icmp source 1.13.55.0.0.0.0.255 destination 2.23.94.0.0.0.0.255 and rule 10 permit ip source 1.13.9.0.0.0.0.255 destination 2.23.30.0.0.0.0.255 may be node values of command-string nodes at a lower level of a command-firstview node whose node value is acl number 3385. area 0.0.0.0 may be a node value of a command-secondview node at a lower level of a command-firstview node whose node value is ospf 1, and network 10.1 may be a node value of a command-string node at a lower level of the command-secondview node whose node value is area 0.0.0.0.

Based on the foregoing example general module, an obtained configuration fragment (which may be denoted as a third configuration fragment below) of the foregoing three different services may be shown as follows

```
<command-lists xmlns="urn:ietf:params:xml:ns:yang:huawei-general">
    <command-list xc:operation="replace">
        <command-name>x</command-name>
            <command-firstview>interface GigabitEthernet0/0/0</command-firstview>
                <command-string>ip address 192.167.2.1 255.255.0.0 </command-string>
        <command-name>y</command-name>
            <command-firstview>acl number 3385</command-firstview>
                <command-string>rule 9 permit icmp source 1.13.55.0 0.0.0.255 destination 2.23.94.0 0.0.0.255</command-string>
                <command-string>rule 10 permit ip source 1.13.9.0 0.0.0.255 destination 2.23.30.0 0.0.0.255</command-string>
        <command-name>z</command-name>
            <command-firstview>ospf 1</command-firstview>
                <command-secondview>area 0.0.0.0</command-secondview>
                    <command-string>network 10.1.1.0
```

```
0.0.0.255</command-string>
                        <command-string>network 10.1.2.0
0.0.0.255</command-string>
                        <command-string>network 10.1.3.0
0.0.0.255</command-command>
            </command-list>
        </command-lists>.
```

Where huawei-general indicates the general module defined in this embodiment of the present disclosure. In other words, the general module defined according to the technical solutions of the present disclosure is newly added in the YANG model, and is represented by "huawei-general" in an XML. Subsequently, after receiving an XML including the third configuration fragment, the network device also parses the XML based on the general module defined in this embodiment of the present disclosure.

Correspondingly, when the control packet is an RPC packet, a control packet (which may be denoted as a first control packet below) including the third configuration fragment may be shown as follows

```
    <rpc xmlns="urn:ietf:params:xml:ns:netconf:base:1.0" message-
id="DEVICECONFIG_c23762ad85b7458086e74cf306062478">
        <edit-config>
            <target>
                <running/>
            </target>
            <error-option>rollback-on-error</error-option>
            <config xmlns:xc="urn:ietf:params:xml:ns:netconf:base:1.0">
                <command-lists xmlns="urn:ietf:params:xml:ns:yang:huawei-
general">
                    <command-list xc:operation="replace">
                    <command-name>x</command-name>
                        <command-firstview>interface
GigabitEthernet0/0/0</command-firstview>
                            <command-string>ip address 192.167.2.1
255.255.0.0 </command-string>
                        <command-name>y</command-name>
                        <command-firstview>acl number
3385</command-firstview>
                            <command-string>rule 9 permit icmp source
1.13.55.0 0.0.0.255 destination 2.23.94.0 0.0.0.255</command-string>
                            <command-string>rule 10 permit ip source
1.13.9.0 0.0.0.255 destination 2.23.30.0 0.0.0.255</command-string>
                        <command-name>z</command-name>
                            <command-firstview>ospf 1</command-firstview>
                            <command-secondview>area
0.0.0.0</command-secondview>
                            <command-string>network 10.1.1.0
0.0.0.255</command-string>
                            <command-string>network 10.1.2.0
0.0.0.255</command-string>
                            <command-string>network 10.1.3.0
0.0.0.255</command-command>
                    </command-list>
                </command-lists>
            </config>
        </edit-config>
    </rpc>.
```

It should be noted that the foregoing examples of the configuration fragment and the control packet may be understood with reference to a syntax rule in a YANG model specified in the IETF standard. Details are not described in this application.

In step 302, optionally, the control device may send the control packet to the network device through a wired Internet, or the control device may send the control packet to the network device through a wireless Internet. This is not limited in this embodiment of this application.

In step 303, the network device may parse the control packet based on a protocol corresponding to the control packet, to obtain the configuration fragment. The control packet may be, for example, an RPC packet, and correspondingly, the protocol corresponding to the control packet may be an RPC protocol. The control packet may be, for example, the foregoing first control packet. After parsing the first control packet based on the RPC protocol, the network device may obtain the foregoing third configuration fragment.

In step 304, the YANG model is also configured on the network device, and the general module defined in this embodiment of the present disclosure is added to the YANG model. For details, refer to related descriptions in step 301. In other words, the YANG model including the general module is configured on the control device, and then the control device may generate the configuration fragment from the configuration command line based on the general module, and send the configuration fragment to the network device using the control packet. The YANG model including the general module is also configured on the network device, and the network device may obtain the configuration command line by parsing the configuration fragment in the control packet based on the general module, and execute the configuration command line.

For example, when the configuration fragment is the first configuration fragment, configuration command lines obtained by parsing the first configuration fragment based on the general module are as follows acl number 3385
rule 9 permit icmp source 1.13.55.0.0.0.0.255 destination 2.23.94.0.0.0.0.255
rule 10 permit ip source 1.13.9.0.0.0.0.255 destination 2.23.30.0.0.0.0.255.

Figure 4:
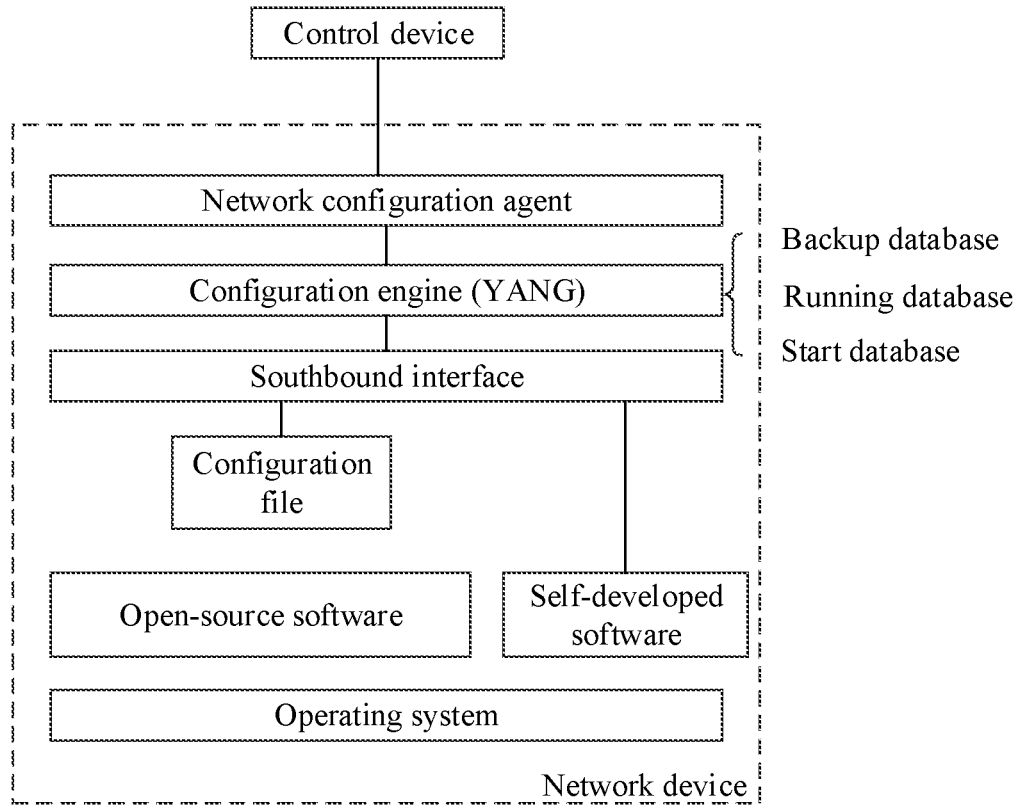
FIG. 4 is a schematic diagram of a software architecture of a network device according to an embodiment of this application.

Optionally, a software architecture of the network device may be shown in a part in a dashed-line box in FIG. 4. An operating system (OS) may be, for example, a LINUX OS, and the operating system has corresponding open-source software. In addition, a software developer may further develop self-developed software, to support related processing provided in this embodiment of this application. Specifically, a network configuration agent (herein, the network configuration agent may be further software that can autonomously run, and is used to perform XML, syntax check) may first perform XML, syntax check on a control packet that is in an XML format and that is received from the control device. After the XML syntax check, a configuration engine obtains a configuration command line based on the YANG model, and executes the configuration command line, to modify a configuration file of a southbound interface. The configuration engine may correspond to three databases. A backup database is used to back up data of the configuration engine, a running database is used to support running of the configuration engine, and a start database is used to obtain data after the configuration engine is started.

In this embodiment, the control device generates the control packet based on the YANG model and the configuration command line, where the control packet includes the configuration fragment, and the configuration fragment meets the definition of the general module in the YANG model, the control device sends the control packet to the network device, and the network device parses the control packet based on the YANG model to obtain the configuration fragment, parses the configuration fragment based on the general module to obtain the configuration command line, and executes the configuration command line. Therefore, for configuration command lines of different services, corresponding configuration fragments can be obtained based on the general module. In other words, only one general module can be maintained for all services, and when a configuration command line of a service changes, the YANG model does not need to be updated (specifically, the general module does not need to be updated). In this way, network configuration and maintenance of the YANG model are simplified, and an existing problem that network configuration and maintenance of the YANG model are complex due to a change of a service is resolved.

Figure 5:
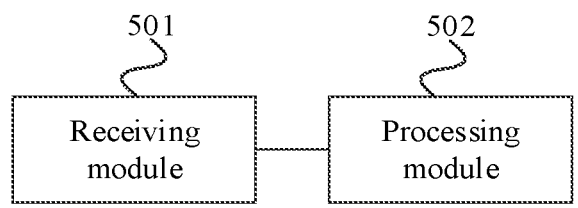
FIG. 5 is a schematic structural diagram of a data configuration apparatus according to an embodiment of this application.

FIG. 5 is a schematic structural diagram of a data configuration apparatus according to an embodiment of this application. The data configuration apparatus may be implemented using software, hardware, or a combination of software and hardware, and is applied to the foregoing network device. As shown in FIG. 5, the data configuration apparatus may include a receiving module 501 configured to receive a control packet sent by a control device, where the control packet is generated by the control device based on a YANG model, and the control packet includes a configuration fragment, and a processing module 502 configured to parse the control packet to obtain the configuration fragment, where the configuration fragment meets a definition of a general module in the YANG model, where the processing module 502 is further configured to parse the configuration fragment to obtain a plurality of configuration command lines, and execute the plurality of configuration command lines.

Optionally, the general module includes a plurality of nodes, the plurality of nodes correspond to the plurality of configuration command lines, a hierarchical relationship between the plurality of nodes reflects an execution sequence of the plurality of configuration command lines, and a node value of each of the plurality of nodes represents one configuration command line.

Optionally, a node name of each of the plurality of nodes represents a level of the node.

Optionally, the general module is independent of a service, and the plurality of configuration command lines belong to a plurality of services.

The apparatus provided in this embodiment may be used to execute the technical solutions on a network device side in the embodiment shown in FIG. 3. The implementation principles and technical effects are similar, and are not further described herein.

Figure 6:
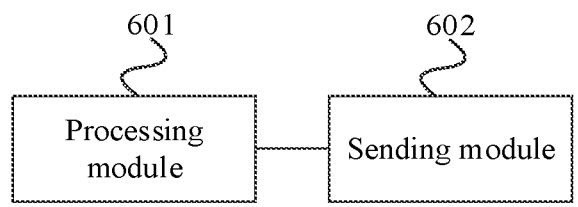
FIG. 6 is a schematic structural diagram of another data configuration apparatus according to an embodiment of this application.

FIG. 6 is a schematic structural diagram of another data configuration apparatus according to an embodiment of this application. The data configuration apparatus may be implemented using software, hardware, or a combination of software and hardware, and is applied to the foregoing control device. As shown in FIG. 6, the data configuration apparatus may include a processing module 601 configured to generate a control packet based on a YANG model and a plurality of configuration command lines, where the control packet includes a configuration fragment, and the configuration fragment meets a definition of a general module in the YANG model, and a sending module 602 configured to send the control packet to a network device.

Optionally, the general module includes a plurality of nodes, the plurality of nodes correspond to the plurality of configuration command lines, a hierarchical relationship between the plurality of nodes reflects an execution sequence of the plurality of configuration command lines, and a node value of each of the plurality of nodes represents one configuration command line.

Optionally, a node name of each of the plurality of nodes represents a level of the node.

Optionally, the general module is independent of a service, and the plurality of configuration command lines belong to a plurality of services.

The apparatus provided in this embodiment may be used to execute the technical solutions on a control device side in the embodiment shown in FIG. 3. The implementation principles and technical effects are similar, and are not further described herein.

Figure 7:
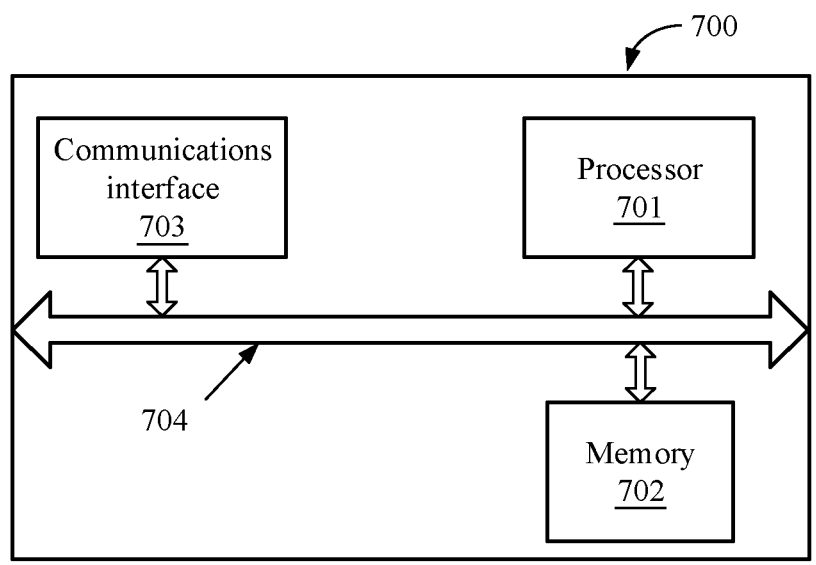
FIG. 7 is a schematic structural diagram of a network device according to an embodiment of this application.

FIG. 7 is a schematic structural diagram of a network device according to an embodiment of this application. As shown in FIG. 7, the network device 700 may include a processor 701, a memory 702, and a communications interface 703. The processor 701, the memory 702, and the communications interface 703 may be connected to each other through a bus 704.

The processor 701 is configured to receive a control packet sent by a control device, where the control packet is generated by the control device based on a YANG model, and the control packet includes a configuration fragment, parse the control packet to obtain the configuration fragment, where the configuration fragment meets a definition of a general module in the YANG model, and parse the configuration fragment based on the general module to obtain a plurality of configuration command lines, and execute the plurality of configuration command lines.

The memory 702 is configured to store the YANG model, including the general module newly defined in the technical solutions of the present disclosure.

The communications interface 703 is configured to communicate with the control device. Certainly, the communications interface 703 may further communicate with another device.

The processor 701 further receives the control packet through the communications interface 703.

Optionally, the memory 702 is further configured to store a computer program. The computer program includes a program instruction, and the processor 701 executes the program instruction to perform a function on a network device side in the method shown in FIG. 3.

Optionally, the general module includes a plurality of nodes, the plurality of nodes correspond to the plurality of configuration command lines, a hierarchical relationship between the plurality of nodes reflects an execution sequence of the plurality of configuration command lines, and a node value of each of the plurality of nodes represents one configuration command line.

Optionally, a node name of each of the plurality of nodes represents a level of the node.

Optionally, the general module is independent of a service, and the plurality of configuration command lines belong to a plurality of services.

Specifically, for the definition and use of the general module, refer to the description in the method shown in FIG. 3. Details are not described herein again.

The network device provided in this embodiment may be used to execute the technical solutions on the network device side in the embodiment shown in FIG. 3. The implementation principles and technical effects are similar, and are not further described herein.

Figure 8:
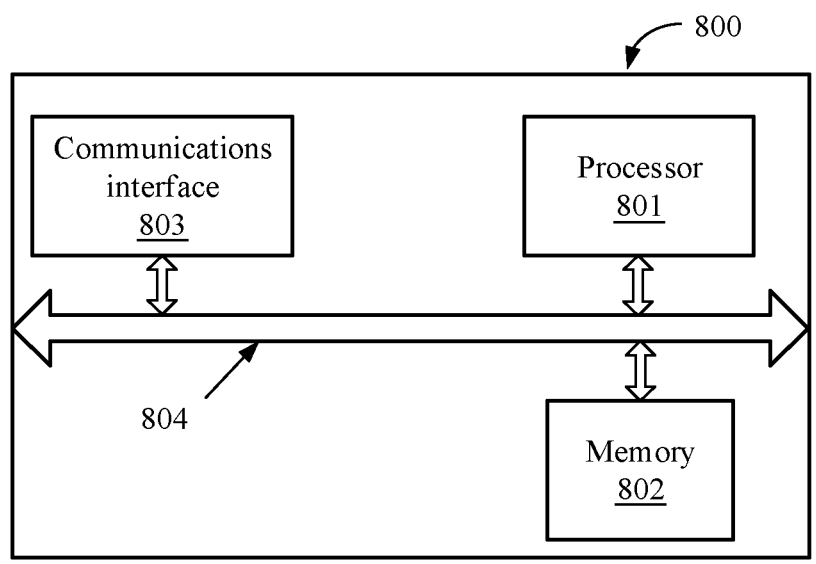
FIG. 8 is a schematic structural diagram of a control device according to an embodiment of this application.

FIG. 8 is a schematic structural diagram of a control device according to an embodiment of this application. As shown in FIG. 8, the control device 800 includes a processor 801, a memory 802, and a communications interface 803. The processor 801, the memory 802, and the communications interface 803 may be connected to each other through a bus 804.

The processor 801 is configured to generate a control packet based on a YANG model and a plurality of configuration command lines, where the control packet includes a configuration fragment, and the configuration fragment meets a definition of a general module in the YANG model, and send the control packet to a network device.

The memory 802 is configured to store the YANG model, including the general module newly defined in the YANG model.

The communications interface 803 is configured to communicate with the network device, and may be further configured to communicate with the service platform shown in FIG. 2. Specifically, the communications interface may include a southbound interface and a northbound interface. An interface of the control device between the control device and the network device may be denoted as the southbound interface, and an interface of the control device between the control device and the service platform may be denoted as the northbound interface.

Optionally, the memory 802 is further configured to store a computer program. The computer program includes a program instruction, and the processor 801 executes the program instruction to perform a function on a control device side in the method shown in FIG. 3.

Optionally, the general module includes a plurality of nodes, the plurality of nodes correspond to the plurality of configuration command lines, a hierarchical relationship between the plurality of nodes reflects an execution sequence of the plurality of configuration command lines, and a node value of each of the plurality of nodes represents one configuration command line.

Optionally, a node name of each of the plurality of nodes represents a level of the node.

Optionally, the general module is independent of a service, and the plurality of configuration command lines belong to a plurality of services.

Specifically, for the definition and use of the general module, refer to the description in the method shown in FIG. 3. Details are not described herein again.

The control device provided in this embodiment may be used to execute the technical solutions on the control device side in the embodiment shown in FIG. 3. The implementation principles and technical effects are similar, and are not further described herein.

An embodiment of this application further provides a configuration system, including the data configuration apparatuses in the embodiments shown in FIG. 5 and FIG. 6 or the network device in the embodiment shown in FIG. 7 and the control device in the embodiment shown in FIG. 8.

All or some of the foregoing embodiments may be implemented using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the procedure or functions according to this application are all or partially generated. The computer may be a general-purpose computer, a dedicated computer, a computer network, or another programmable apparatus. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state disk (SSD)), or the like.

What is claimed is:

1. A data configuration method, comprising:
receiving a control packet from a control device, wherein the control packet is based on a yet another next generation (YANG) model, and wherein the control packet comprises a configuration fragment comprising a node value;
parsing the control packet to obtain the configuration fragment, wherein the configuration fragment meets a definition of a general module in the YANG model, wherein the general module comprises a plurality of nodes, wherein one of the nodes has the node value, and wherein the one of the nodes represents a plurality of configuration command lines;

parsing the configuration fragment based on the general module and the node value to obtain the plurality of configuration command lines; and executing the configuration command lines responsive to parsing the configuration fragment of the control packet.

2. The data configuration method of claim 1, wherein a location relationship between the nodes reflects an execution sequence of the configuration command lines.

3. The data configuration method of claim 2, wherein a node name of each of the nodes represents a level of the node.

4. The data configuration method of claim 3, wherein the general module is independent of a service, and wherein the configuration command lines belong to a plurality of services.

5. The data configuration method of claim 2, wherein the general module is independent of a service, and wherein the configuration command lines belong to a plurality of services.

6. The data configuration method of claim 1, wherein the general module is independent of a service, and wherein the configuration command lines belong to a plurality of services.

7. A data configuration method, comprising:

generating a control packet based on a yet another next generation (YANG) model and a plurality of configuration command lines, wherein the control packet comprises a configuration fragment comprising a node value, wherein the configuration fragment meets a definition of a general module in the YANG model, wherein the general module comprises a plurality of nodes, wherein one of the nodes has the node value, and wherein the one of the nodes represents a plurality of configuration command lines; and sending the control packet to a network device.

8. The data configuration method of claim 7, wherein a location relationship between the nodes reflects an execution sequence of the configuration command lines.

9. The data configuration method of claim 8, wherein a node name of each of the nodes represents a level of the node.

10. The data configuration method of claim 9, wherein the general module is independent of a service, and wherein the configuration command lines belong to a plurality of services.

11. The data configuration method of claim 8, wherein the general module is independent of a service, and wherein the configuration command lines belong to a plurality of services.

12. The data configuration method of claim 7, wherein the general module is independent of a service, and wherein the configuration command lines belong to a plurality of services.

13. A data configuration apparatus, comprising:

a communications interface configured to receive a control packet from a control device, wherein the control packet is based on a yet another next generation (YANG) model, and wherein the control packet comprises a configuration fragment comprising a node value; and a processor coupled to the communications interface and configured to:

parse the control packet to obtain the configuration fragment, wherein the configuration fragment meets a definition of a general module in the YANG model, wherein the general module comprises a plurality of nodes, wherein one of the nodes has the node value, and wherein the one of the nodes represents a plurality of configuration command lines;

parse the configuration fragment based on the general module and the node value to obtain the plurality of configuration command lines; and execute the configuration command lines responsive to parsing the configuration fragment of the control packet.

14. The data configuration apparatus of claim 13, wherein a location relationship between the nodes reflects an execution sequence of the configuration command lines.

15. The data configuration apparatus of claim 14, wherein a node name of each of the nodes represents a level of the node.

16. The data configuration apparatus of claim 14, wherein the general module is independent of a service, and wherein the configuration command lines belong to a plurality of services.

17. The data configuration apparatus of claim 13, wherein the general module is independent of a service, and wherein the configuration command lines belong to a plurality of services.

18. A data configuration apparatus, comprising:

a processor configured to generate a control packet based on a yet another next generation (YANG) model and a plurality of configuration command lines, wherein the control packet comprises a configuration fragment comprising a node value, wherein the configuration fragment meets a definition of a general module in the YANG model, wherein the general module comprises a plurality of nodes, wherein one of the nodes has the node value, and wherein the one of the nodes represents a plurality of configuration command lines; and a communications interface coupled to the processor and configured to send the control packet to a network device.

19. The data configuration apparatus of claim 18, wherein a location relationship between the nodes reflects an execution sequence of the configuration command lines.

20. The data configuration apparatus of claim 19, wherein a node name of each of the nodes represents a level of the node.

* * * * *